United States Patent [19]

Shiraishi et al.

[11] Patent Number: 4,794,404

[45] Date of Patent: Dec. 27, 1988

[54] THERMAL TRANSFER PRINTER

[75] Inventors: Mikio Shiraishi, Yokohama; Toshihiko Gotoh, Tokyo; Koutarou Tanno, Kamakura; Kentaro Hamma, Yokohama, all of Japan

[73] Assignees: Hitachi Ltd.; Hitachi Video Engineering, Incorporated, both of Tokyo, Japan

[21] Appl. No.: 937,570

[22] Filed: Dec. 3, 1986

[30] Foreign Application Priority Data

Dec. 5, 1985 [JP] Japan .............................. 60-272666

[51] Int. Cl.[4] .......................... G01D 15/10; B41J 3/20; B65H 39/10; G03G 15/00

[52] U.S. Cl. .............................. 346/76 PH; 346/136; 271/225; 271/301; 271/258; 355/3 SH; 355/14 SH; 400/120; 400/240.4; 400/583

[58] Field of Search .......................... 346/76 PH, 136; 400/120, 240.4, 583; 355/3, 14 SH; 271/225, 301, 258

[56] References Cited

U.S. PATENT DOCUMENTS 4,623,900 11/1986 Watanabe ...................... 346/76 PH

FOREIGN PATENT DOCUMENTS 2950392 6/1981 Fed. Rep. of Germany .

60-44373 3/1985 Japan ................................ 400/120

60-190369 9/1985 Japan ................................ 400/120

*Primary Examiner*—E. A. Goldberg

*Assistant Examiner*—Gerald E. Preston

*Attorney, Agent, or Firm*—Antonelli, Terry & Wands

[57] ABSTRACT

A thermal transfer printing apparatus comprises a recording sheet conveying passageway of a chuckless type which does not require a chuck mechanism for affixing a recording sheet to a platen roller. The recording sheet conveying passageway is constituted in loop form by at least one guide member and at least one roller for conveying the recording sheet and has at one end a recording sheet ejector for ejecting the recording sheet to outside from the conveying passageway. The recording sheet is moved through the conveying passageway repeatedly for a number of times required to perform superimposing printing by means of a thermal head. Upon completion of printing, the recording sheet is ejected from the apparatus to outside via the recording sheet ejector.

11 Claims, 6 Drawing Sheets

THERMAL TRANSFER PRINTER

BACKGROUND OF THE INVENTION

This invention relates generally to thermal transfer printer and, more particularly, it is concerned with a printer of the type described which is suitable for use in receiving electric picture signals and reproducing on a sheet, such as paper, images which correspond to the picture signals received.

One type of thermal transfer printer known in the art is disclosed in a report entitled "COLOR VIDEO PICTURE PRINTER" by Masuda, which appeared in "IEEE TRANSACTION ON CONSUMER ELECTRONICS", vol. CE-28, August 1982. In this printer, a recording paper or sheet is affixed at one end thereof to the outer circumferential surface of a platen of substantially cylindrical configuration and is wound thereon. Then, the platen is driven for rotation and, while it makes one complete revolution, a thermal head is pressed against the recording sheet through a sheet of ink support material generally referred to as a color dye sheet. The color dye sheet is heated by the thermal head and an image is printed on a recording sheet as the ink of the color dye sheet is transferred to the recording sheet. There are three types of color dye sheet including those of cyan, magenta and yellow, for example. After the transfer printing using one type of color dye sheet is finished, the same process is repeated by using a color dye sheet of another color, to print an image of another color on the recording sheet while the platen makes another complete revolution. Thus, by supposing a plurality of images of different colors one over another on the same recording sheet, a desired image can be printed by transfer printing on the same recording sheet in desired colors.

The printer of the prior art of the aforesaid construction offers the advantage that, since the recording sheet is fixedly secured to the platen of substantially cylindrical configuration, no variation or shift occurs in the position of the recording sheet as the platen rotates, so that the risk that irregularities might be caused to occur in the colors of the printed image by the mismatching of the recording sheet with the color dye sheets. However, when the recording sheet used is large in size, it would be necessary to increase the diameter of the platen to enable the recording sheet of large size to be wound thereon completely. Besides, the platen has at one location on its outer circumferential surface a mechanism for affixing one end of the recording sheet. When it is desired to print images in a single color continuously on a web of paper in the form of a roll, for example, by using this platen, the fixing mechanism referred to hereinabove interferes with the operation of winding the web on the platen, making it impossible to achieve correct positioning of the web on the platen.

Another printer disclosed in Japanese Patent Application Laid-Open No. 58-140271, for example, is known as another type of this apparatus. In this printer, a roller is mounted on either sides of a platen in a manner to hold the platen by two rollers. In operation, one recording sheet is inserted between the platen and each roller and wound on about one-half the outer circumferential surface of the platen. Thus, the recording sheet is brought into intimate contact with about one-half the outer circumferential surface of the platen because it is forced thereagainst by the two rollers. As the platen is rotated in a predetermined direction, the two rollers rotate together with the platen, so as to feed the recording sheet on the platen in one direction. At this time, a thermal head is urged against the recording sheet on the platen through an ink donor film. An electric current is successively passed to the thermal head in accordance with image information to heat the ink donor film which is positioned against the thermal head, so that ink adheres to the recording sheet. Rotation of the platen feeds the recording sheet, to successively record images starting with the location on the recording sheet at which recording is initiated. As the thermal head reaches a location on the recording sheet at which recording is terminated, the platen is rotated in the reverse direction, to feed the recording sheet in the reverse direction and return the same to the recording initiation location. While the recording sheet is being returned to the recording initiation position, the ink donor film is moved so that a different color zone is brought to the recording initiating position. The ink donor films each have a plurality of zones or bands of different colors arranged lengthwise thereof. After the used ink donor film has been replaced by a new ink donor film, the aforesaid process is repeated to record image information on the recording sheet, starting at the recording initiation location. In this way, recording of image information in color is effected by superposing a plurality of color images one over another on the same recording sheet.

This printer is capable of recording image information on a recording sheet of large size and on a continuous web of paper in roll form. However, when recording is effected by superposing one color image portion over other color image portions, it is necessary to feed the recording sheet in the reverse direction when replacement of the color zone on the ink donor sheet to another color zone is effected, to return the recording sheet to the recording initiation location. This operation is time-consuming, thereby increasing the overall period of time required for recording image information. Another disadvantage of this printer is that, since the recording sheet is moved back and forth a plurality of times by rotating the platen in opposite directions, changes or shifts might occur, although slight, in the position of the recording sheet on the platen as the recording sheet is moved in reciprocatory movement several times, thereby causing inaccurate overlapping to occur in the colors of the recorded image.

Another printer of this type of the prior art is disclosed in Japanese patent application Laid-Open No. 57-45072. This printer has two rollers arranged parallel to each other in spaced-apart relation and connected together by an endless belt. In operation, a recording sheet is affixed at one end thereof to the surface of the belt and is wound thereon. Then, one of the rollers is rotated to cause the belt having the recording sheet wound thereon to move on the two rollers. While the belt makes one complete revolution along the path of its travel on the two rollers, a thermal head presses an ink donor sheet against the surface of the recording sheet wound on the surface of the belt, and the ink donor sheet is heated by the thermal head to record image information on the surface of the recording sheet. A plurality of ink donor sheets are used, and the same process is repeated to provide a sheet of recorded image by superposing image information of different colors one over another.

Some disadvantages are associated with this printer. The belt is formed of elastic material and tends to expand and contract (when the belt is moved in contact with two rollers, it is expanded; when the belt is moved out of contact with the rollers, it is not expanded). Meanwhile the recording sheet neither expands nor contracts. Therefore, when one end of the recording sheet is affixed to the surface of the belt, the recording sheet might separate itself from the surface of the belt and become loose during the movement of the belt, so that the recording sheet might catch against other parts of the printer and become wrinkled. Also, if a slip occurs between the belt and the rollers, the position of the recording sheet wound on the belt might undergo a change and the sheet of recorded image might suffer inaccurate overlapping of color. In this printer, no attention has ever been paid to these problems.

The printers of the prior art outlined hereinabove are summarized as follows. In apparatus for recording an image in color on a recording sheet by superposing a plurality of colors of image information one over another, the problems that should be solved are that (1) no inaccurate overlapping of color should occur in the sheet of recorded image, (2) the apparatus should be able to handle recording sheets of a wide range of sizes, (3) the apparatus should be compact in overall size, and (4) the apparatus should be high in performance and free from a loss of time in feeding sheets.

SUMMARY OF THE INVENTION

An object of this invention is to provide a thermal tranffer printing apparatus which is capable of recording image information on a recording sheet of a large size in spite of the body of the apparatus being compact in size.

Another object is to provide a thermal transfer printing apparatus which is free from the risk of inaccurate overlapping of colors occurring in the sheet of recorded image in spite of the construction of the apparatus which is provided with no means for affixing a recording sheet to the platen, i.e., chuckless construction.

A thermal transfer printing apparatus according to the invention is so arranged as to have a recording sheet conveying passageway in the form of a loop constituted by recording sheet guide members and a recording sheet conveyor member, a recording sheet being fed through the conveying passageway into a recording section constituted by opposite surface portions of a thermal head and a platen roller. This enables a recording sheet to be conveyed without using a chuck and allows the length of the conveying passageway to have any length as desired irrespective of the diameter of the platen roller.

DETAILED DESCRIPTION

Figure 2:
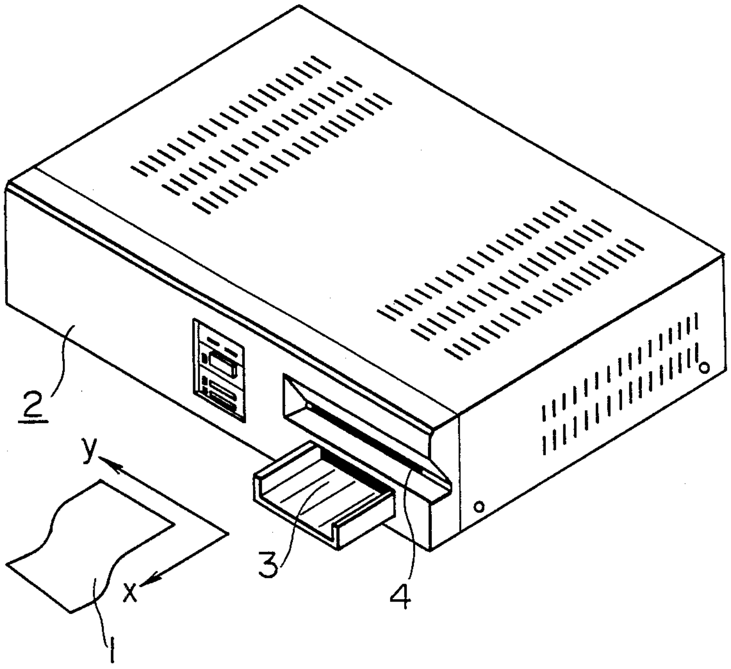
FIG. 2 is a perspective view of the thermal transfer printing apparatus shown in FIG. 1.

As shown in FIG. 2, the thermal transfer printing apparatus according to the invention comprises a body 2 formed with a recording sheet feeding slit 3. A recording paper or sheet 1 is fed into the body 2 through the feeding slit 3, and is discharged from the body 2 through a recording sheet ejecting slit 4 after an image is printed on the recording sheet.

Figure 1:
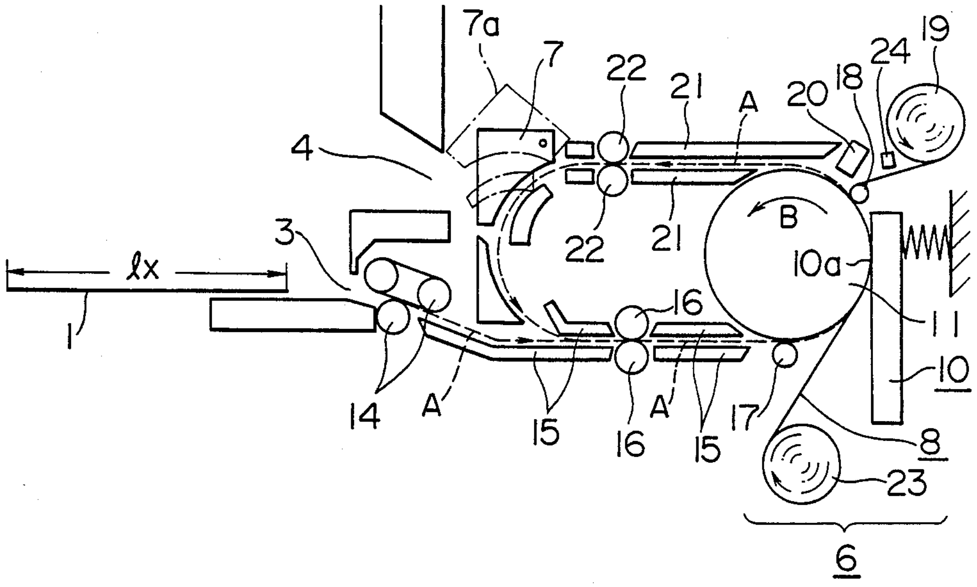
FIG. 1 is a schematic side elevational view of one embodiment of the thermal transfer printing apparatus in conformity with the invention, showing its internal structure in some detail.

FIG. 1 shows an internal structure of the body 2. An embodiment of the thermal transfer printing apparatus shown in the figure in conformity with the invention comprises a recording section 6, an ejection sector 7, an ink donor sheet 8, a thermal head 10, a platen 11, a pair of feed rollers 14, a pair of lower guide members 15, a pair of lower drive rollers 16, a recording sheet pressing roller 17, a separation roller 18, a takeup reel 19, a recording sheet end portion sensor 20, a pair of upper guide members 21, a pair of upper drive rollers 22, an ink donor sheet feed roll 23 and an ink donor sheet position sensor 24.

As shown in FIG. 1, the recording sheet 1 fed into the apparatus through the recording sheet feeding slit 3 moves along a conveying passageway indicated by a broken line A to the recording section 6 where printing is performed in one color on the recording sheet 1 as subsequently to be described. Upon completion of printing in one color, the recording sheet 1 makes a circuit of the conveying passageway A and returns to the recording section 6 where printing is performed thereon in another color. After this process is repeated to perform printing on the recording sheet 1 in a predetermined number of colors to be recorded, the ejection sector 7 located in one portion of the conveying passageway A moves from a solid line position to a dot-and-chain line position *7a* to eject the recording sheet 1 to outside via the ejection sector 7 and through the ejecting slit 4.

Operation of the embodiment shown in FIG. 1 will be described in detail, starting with the recording section 6.

Figure 3:
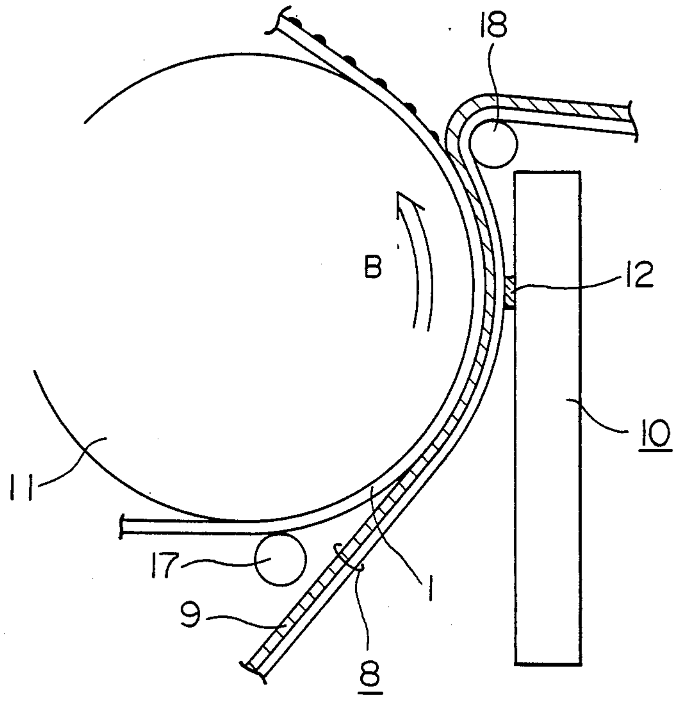
FIG. 3 is a view, on an enlarged scale, of the recording section of the apparatus shown in FIG. 1.

Referring to FIG. 3, the ink donor sheet 8 has on one side thereof an ink layer 9 (which may be a layer formed of a dye having the property of sublimation) which is brought into contact with one side of the recording sheet 1 between a thermal head 10 and a platen 11, so that the ink donor sheet 8 and recording sheet 1 press against each other. The thermal head 10 has a predetermined number (corresponding to the number of recorded dots) of heat generating elements 12 mounted thereon along a direction perpendicular to the plane of FIG. 3 (a main scanning direction).

An electric current is passed by any suitable means, not shown, in accordance with image information to the heat generating elements 12 on the thermal head 10. As the heat generating elements 12 generate heat, portions of the ink layer 9 of the ink donor sheet 8 maintained in contact with the heat generating elements 12 undergo sublimation, so that the ink is evaporated and adheres to the surface of the recording sheet 1 to record image information thereon. After image information is recorded for one line in the main scanning direction, the platen 11 moves in rotary movement in an auxiliary scanning direction (as indicated by an arrow B), so that the recording sheet 1 and ink donor sheet 8 (including the ink layer 9) move to prepare for recording the next flllowing line of image information.

The ink layer 9 on one side of the ink donor sheet 8 has a color whose tone may be readily varied depending on the type of coloring material (dye) used. Particularly, when recording of image information is carried out by superposing a plurality of colors one over another, the ink layer 9 of the ink donor sheet 8 includes a plurality of sections of different color tones extending longitudinally (the direction of movement) of the ink donor sheet 8.

Figure 4:
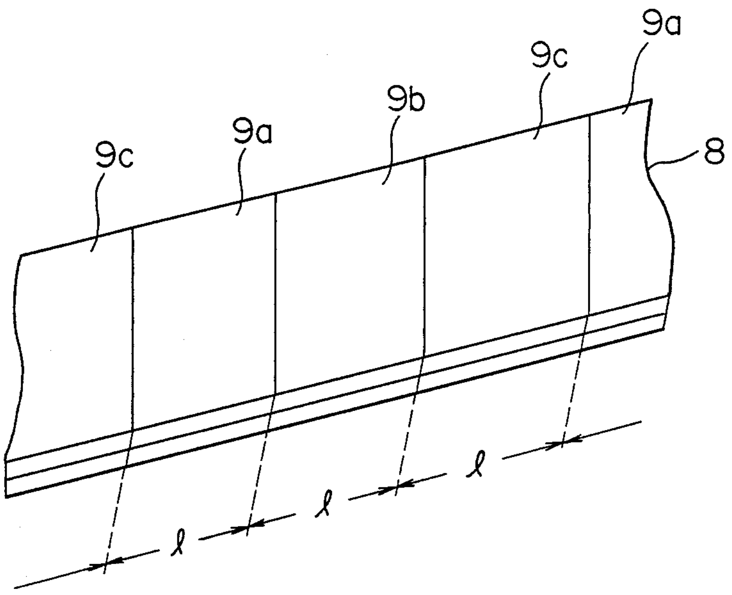
FIG. 4 is a view of an ink donor sheet, showing one portion thereof.

FIG. 4 shows a portion of the ink donor sheet 8. The ink donor sheet 8 shown in the figure is divided into a plurality of zones of different colors including a cyan zone 9*a*, a magenta zone 9*b* and a yellow zone 9*c* which are arranged longitudinally in the indiated order. Each of the three zones 9*a*, 9*b* and 9*c* of different colors has a length l which is greater than the length of the recording sheet 1 as measured in an X direction as shown in FIG. 2.

In printing image information on the recording sheet 1, image information can be printed in a mixture of colors as follows. First, image information corresponding to one picture may be printed in a cyan color on one surface of the recording sheet 1 by using the zone 9*a* of the ink layer 9 of the ink donor sheet 8. Then, image information may be printed by using the zone 9*b* or 9*c* of the ink layer 9 of the ink donor sheet 8 on the portion of the surface of the recording sheet 1 on which the image information in the cyan color has already been printed. As a result, the two color regions are superposed one over the other, and the two different colors of the ink are mixed together to record an image in a desired color. Of course, three or more different colors of ink may be used to record an image in any desired color.

Referring to FIG. 1 again, operation of the embodiment shown therein will be described in detail.

The recording sheet 1 fed through the feeding slit 3 into the body 2 (see FIG. 2) is introduced into the interior of the body 2 by the pair of feed rollers 14 and is moved by the lower pair of drive rollers 16 through the lower pair of guide members 15 before reaching the recording section 6. The recording sheet 1 is sufficiently stiff to enable its leading edge to move straightforwardly between the pair of lower guide members 15 as it is pushed forwardly by the pairs of rollers 14 an 16.

Upon reaching the recording section 6, the recording sheet 1 is held against the platen 11 by the recording sheet pressing roller 17 and is brought into intimate contact with the ink donor sheet 8 by a force of friction produced when the recording sheet 1 is held against the platen 11 and is brought into intimate contact with the ink donor sheet 8 as the platen 11 rotates in the direction of the arrow B. As shown, the ink donor sheet 8 is in the form of a web of ink supporting material in roll form. Further rotation of the platen 11 moves the platen 11, recording sheet 1 and ink donor sheet 8 as a unit (while they are maintained in intimate contact with each other) to a contact surface portion 10*a* of the thermal head 10. Located downstream of the thermal head 10 is the separation roller 18 which is operative to separate the ink donor sheet 8 from the recording sheet 1 and directs the same toward the takeup reel 19.

Located downstream of the separation roller 18 is the recording sheet end portion sensor 20 which senses the leading edge of the recording sheet 1 and determines that the recording sheet 1 has reached a position in which recording can be commenced. The sensor 20 produces a signal which drives a thermal head drive circuit, not shown, so that recording of an image is started.

Figure 6:
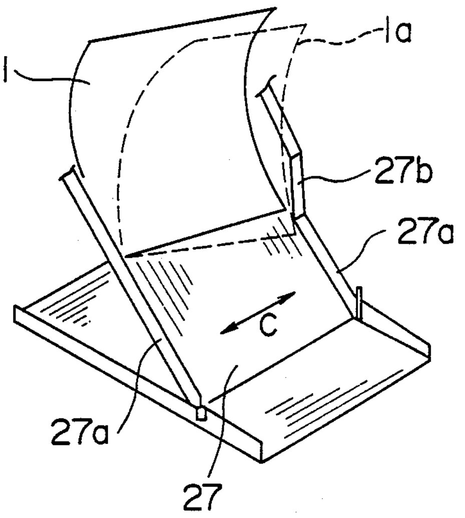
FIG. 6 is a perspective view of the recording sheet position regulating means of the thermal transfer printing apparatus shown in FIG. 5.

As the recording of the image progresses, the recording sheet 1 is moved through the upper pair of guide members 21 and upper pair of drive rollers 22 before reaching the ejection sector 7. When the ejection sector 7 is in a position indicated by the solid lines, the recording sheet is moved through the lower pair of guide rollers 15 and lower pair of drive rollers 16 again, to reach the recording section 6. The conveying passageway A for the recording sheet 1 to be conveyed therethrough has an overall length which is greater than the length of the recording sheet 1 as measured in the longitudinal direction. Thus, when recording of the image in one color is finished, the leading edge of the recording sheet 1 has not yet reached the recording section 6. There is a certain period of time during which only the ink donor sheet 8 exists between the thermal head 10 and platen 11, as it happens when the recording operation is initially started. Simultaneously as a portion of the first color of the ink layer 9 or the cyan zone 9*a*, for example, is wound on the takeup reel 19, a portion of the second color of the ink layer 9 or the magenta zone 9*a*, for example, is paid out of the ink donor sheet feed reel 23. As the recording sheet 1 reaches the recording section 6, the ink donor sheet 8 is fed to the recording section 6 while being kept in intimate contact with the recording sheet 1 as the platen 11 rotates, in the same manner as that in which the operation for printing the image in the first color is performed. As is the case with the printing of the image in the first color, the leading edge of the recording sheet 1 is sensed by the recording sheet end portion sensor 20 which produces signal for starting a series of recording operations. At this time, the correct position of the recording sheet 1 is determined by the recording sheet end portion sensor 20, so that recording in the second color is effected in the same position on the recording sheet 1 on which recording in the first color has been effected. Positioning of the recording sheet in a Y direction in FIG. 2 is effected, when the recording sheet 1 is guided by the lower guide members 15 in its movement, as by a parallel guide portion 27*a* (see FIG. 6) located in the lower guide members 15 for regulating the position of the recording sheet 1 in the Y direction.

Meanwhile the ink donor sheet 8 has the position of the zone of color (9*a*, 9*b* or 9*c*), which is used for effecting recording, sensed by the ink donor sheet position sensor 24 which controls the position of the ink donor sheet 8 in such a manner that the zone of color (9*a*, 9*b* or 9*c*) which is used for effecting recording is correctly positioned with the recording sheet as viewed longitudinally when they are brought into intimate contact with each other. By keeping the thermal head 10 away from the platen 11 when no recording sheet 1 exists in the recording section 6, it is possible to stop the movement of the ink donor sheet 8 or to move it freely in the longitudinal direction, even if the platen 11 rotates in the B direction. This facilitates the positioning of the ink donor sheet 8.

When the image has been recorded in predetermined colors by the aforesaid series of operations, the ejection sector 7 is moved to the dot-and-chain line position 7*a* by suitable means (such as a plunger solenoid), not shown. This allows the recording sheet 1 released from the recording section to be ejected through the ejecting slit 4 via the ejection sector 7 after being conveyed through the upper pair of guide members 21 and pair of upper drive rollers 22.

A recording operation normally performed by the embodiment of the invention has been described.

In this embodiment, when the length of the recording sheet 1 used is smaller than a predetermined length $l_x$ (see FIG. 1), no trouble occurs if its length is greater than the distance between the pairs of drive rollers and the distance between each pair of drive rollers and the platen, because the recording sheet is driven in any one of drive sections covering the aforesaid distances after being inserted into the body 2 through the feeding slit 3.

The operation of the embodiment in which an image is recorded on a continuous recording web in roll form, for example, by using ink of one color will be described.

When an image is recorded in one color, the ink layer 9 supported on one surface of the ink donor sheet 8 consists of ink of only one color. The recording web fed through the feeding slit 3 moves through the conveying passageway A and is ejected through the ejecting slit 4 when the leading edge of the web reaches the ejection sector 7 because it is kept in the dot-and-chain line position 7*a* at all times.

In the embodiment shown and described hereinabove, the feeding slit 3 and ejecting slit 4 are located in separate positions, so that a web of any length as desired may be used for recording images thereon without any trouble. Although the invention has been shown and described as using a dye of the property of thermal sublimation for constituting the ink layer 9 of the ink donor sheet 8, the invention is not limited to this specific form of ink and any pigment in a solid state that can be melted by heat may be used.

Another embodiment of the invention will now be described by referring to FIG. 5 in which parts similar to those shown in FIGS. 1–4 are designated by like reference characters and their description will therefore be omitted. In the printing apparatus shown in FIG. 5, a recording sheet conveying passageway is constituted by a movable guide member 25, a fixed guide member 26 and a recording sheet guide member 27.

Figure 5:
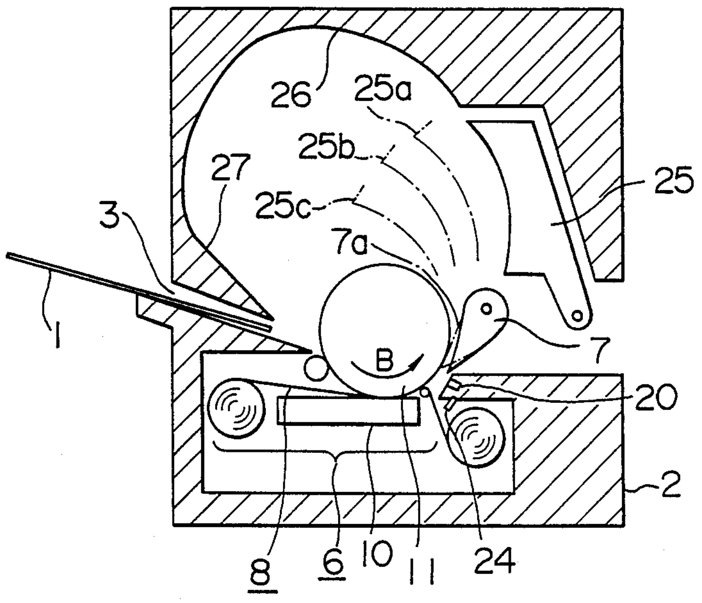
FIG. 5 is a schematic cross-sectional view of another embodiment of the thermal transfer printing apparatus in conformity with the invention, showing its internal structure in some detail.

As shown in FIG. 5, the recording sheet 1 fed into the body 2 through the recording sheet feeding slit 3 first enters the recording section 6 in which it is brought into intimate contact with the ink layer 9 of the ink donor sheet 8 and is moved by the platen 11 rotating in the direction of the arrow B. As the leading edge of the recording sheet 1 reaches the recording sheet end portion sensor 20, the sensor 20 generates a signal for commencing a series of recording operations. The operation of the recording section 6 is similar to that described by referring to FIG. 3, so that its description will be omitted.

After recording is effected in one color, the recording sheet 1 is guided by the ejection sector 7, when it is in a dot-and-chain line position, to move along the movable guide 25 and fixed guide 26 due to its rigidity, and falls by its own weight into the recording section 6 again through the recording sheet guide member 27. Means for regulating the position of the recording sheet 1 oriented perpendicularly to the plane of FIG. 5 will be described by referring to FIG. 6.

The recording sheet 1 on which an image has been recorded reaches by its rigidity an entrance to the recording sheet guide member 27 and moves into the guide member 27 where it is moved by an inclined guide portion 27*b* to a position in which it is guided by a parallel guide portion 27*a* while its position is regulated with respect to the direction of an arrow C. If the recording sheet 1 is skewed when it moves into the position in which it is guided by the parallel guide portion 27*a*, the recording sheet 1 might stop moving at the parallel guide portion 27*a* as indicated by broken lines. However, further movement of the recording sheet 1 due to the drive force from the recording section 6 influences the posture of the recording sheet 1, so that the recording sheet 1 becomes parallel to the parallel guide portion 27*a* when it is introduced into the recording section 6 again.

After image recording in a plurality of colors is finished, the ejection sector 7 is moved to the dot-and-chain line position 7*a* by drive means (such as a plunger solenoid), not shown, so that the recording sheet 1 is ejected to outside through the ejecting slit 4 as shown in FIG. 5.

When recording sheets of different sizes are used, the movable guide member 25 is pivotally moved to any one of positions 25*a*, 25*b* and 25*c* indicated by the dot-and-chain lines to adjust the length of the recording sheet conveying passageway in accordance with the size of the recording sheet 1 used.

When recording of an image is effected by using ink of one color on a continuous recording web in roll form, one only has to move the ejection sector 7 beforehand to the dot-and-chain line position 7*a*.

The embodiment shown in FIG. 5 has no drive rollers and offers the advantage that the recording sheet drive mechanism is simple in construction because the recording sheet 1 is conveyed through the interior of the body 2 only by the rotation of the platen 11.

Figure 7:
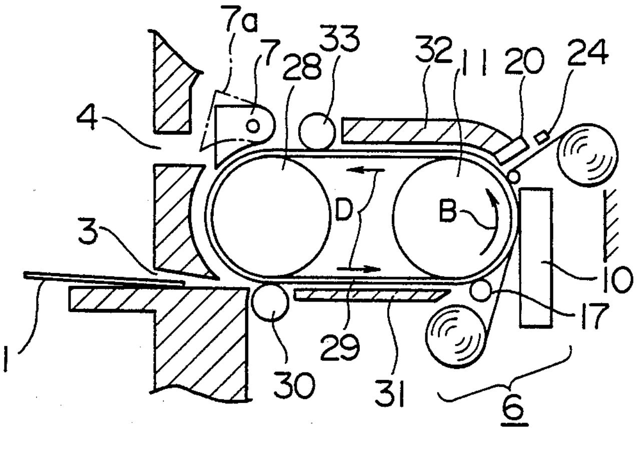
FIG. 7 is a schematic cross-sectional view of still another embodiment of the thermal transfer printing apparatus in conformity with the invention, showing its internal structure in some detail.

FIG. 7 shows still another embodiment of the invention. In FIG. 7, parts similar to those shown in FIGS. 1 through 4 are designated by like reference characters and their description will therefore be omitted. In the printing apparatus shown in FIG. 7, a follower roller 28, an endless elastic belt 29, a lower follower roller 30, a lower guide member 31, an upper guide member 32 and an upper follower roller 33 constitute a recording sheet conveying passageway.

In this embodiment, rotation of the platen 11 in a direction indicated by an arrow B moves the endless elastic belt 29 in a direction indicated by an arrow D between the platen 11 and follower roller 28, thereby rotating the lower follower roller 30, upper follower roller 33 and recording sheet pressing roller 17 which are positioned in contact with the endless elastic belt 29. In this embodiment, the operation of the recording section 6 is similar to that described by referring to FIG. 3, so that its description is omitted.

In the printing apparatus shown in FIG. 7, the recording sheet 1 inserted through the recording sheet feeding slit 3 is conveyed by the endless elastic belt 29 and lower follower roller 30 in the direction of movement of the endless belt 29 indicated by the arrow D and moves between a lower run of the endless belt 29 and the lower guide member 31 before reaching the recording section 6. As the recording sheet 1 is further moved forwardly and its leading edge reaches the recording sheet end portion sensor 20, a signal is pooduced by the sensor 20 to pass an electric current to the thermal head 10 to start a series of recording operations. After recording is effected, the recording sheet 1 moves between an upper run of the endless belt 29 and the upper guide member 32 and is further moved by the upper follower roller 33 and the upper run of the endless belt 29 before reaching the ejection sector 7. The ejection sector 7 remains in the solid line position until recording is performed in a predetermined number of colors.

According to the invention, a series of recording operations are performed while driving the recording sheet conveyor means as a whole by the rotating platen 11. When recording on the recording sheet 1 in a predetermined number of colors is finished, the ejection sector 7 is moved to the dot-and-chain line position *7a* by suitable means, not shown, so that the recording sheet 1 is ejected from the apparatus through the ejecting slit 4.

When recording is carried out by using ink of one color on a continuous recording web in roll form, for example, one only has to move the ejection sector 7 to the dot-and-chain line position *7a* before the operation is started.

Like the apparatus shown in FIG. 5, the apparatus shown in FIG. 7 is capable of conveying the recording sheet 1 through the apparatus by the rotating platen 11. This offers the advantage that the drive mechanism can have a simple construction.

In the embodiment shown in FIG. 7, the recording sheet 1 is not affixed to the endless elastic belt 29, as contrasted with the recording sheet affixed to the belt in the prior art referred to hereinabove. The recording sheet 1 is driven for movement through the recording sheet conveying passageway by drive forces exerted thereon only at the points of contact between the endless belt 29 and the follower rollers 30, 33 and 17 and at the point at which the thermal head 10 forces the recording sheet 1 to press against the platen 11. Thus, the risk that the recording sheet 1 might become loose and wrinkled as the endless belt 29 expands or contracts can be avoided, making it possible to convey the recording sheet 1 through the sheet conveying passageway without any trouble.

The printing apparatus according to the invention offers the following advantages. (a) When image information is recorded on a recording sheet by superposing a plurality of colors one over another, the recording sheet is conveyed without being affixed to the conveyor. This allows the conveying mechanism to be simplified in construction and allows the overall size, weight and costs of the apparatus to be reduced. In addition, the apparatus is capable of readily accommodating a change in the size of the recording sheet used for recording.

(b) The recording sheet is moved in one direction in the apparatus while a series of recording operations are performed. This allows positioning of the recording sheet at a recording location to be achieved admirably by using only a guide member of simple construction for avoiding deviation of the recording sheet from a predetermined path of movement and means for sensing a leading end portion of the recording sheet. This is conducive to prevention of the occurrence of inaccurate overlapping of color.

(c) If the recording sheet used has a suitable length, then an end portion of the recording sheet on which recording is to be performed in the second color tone comes close to the recording section of the apparatus at a point in time when a series of recording operations performed in the first color tone have finished. This allows recording in the second color tone to be performed without a loss of time following the completion of recording in the first color tone. This is conducive to a reduction in the overall recording time.

What is claimed is:

1. A thermal transfer printing apparatus comprising printing means and ink donor sheet feeding means for feeding an ink donor sheet coated with inks of a plurality of color tones to said printing means, to print an image on a recording sheet by transfer printing, wherein said printing means comprises:

a heat generating member for generating heat when an electric current is passed thereto; and a platen roller against which the recording sheet is urged by said heat generating member through said ink donor sheet fed by said ink donor sheet feeding means, said thermal transfer printing apparatus comprising:

recording sheet conveyor means for conveying the recording sheet to said printing means, said recording sheet conveyor means including:

(a) sheet feeding passageway forming means for forming a sheet feeding passageway into which the recording sheet is fed;

(b) sheet conveying passageway forming means comprising (1) recording sheet guide means for regulating the direction in which the recording sheet is conveyed, and (2) recording sheet conveying means for conveying the recording sheet, said recording sheet guide means and said recording sheet conveying means cooperating with each other to constitute a recording sheet conveying passageway in loop form which remains closed while one sheet is being printed for conveying the recording sheet therealong, said printing means being provided in a part of said recording sheet conveying passageway;

(c) sheet ejection passageway forming means for forming a sheet ejection passageway through which the recording sheet is ejected out of the apparatus;

(d) sheet ejection means disposed in a part of said recording sheet conveying passageway, said recording paper being led from said conveying passageway to said sheet ejection passageway upon completion of printing a number of times corresponding to the number of colors of ink on the ink sheet, and (e) recording sheet tip detecting means disposed in a part of said conveying passageway in said loop form and adapted to detect a tip of said recording sheet, wherein said recording sheet is conveyed through said conveying passageway in said loop form said number of times corresponding to said number of colors of ink of said ink sheet, and said printing means supplies to said heat generating member a recording signal corresponding to each of said colors upon receipt of a signal from said recording sheet tip detecting means.

2. A thermal transfer printing apparatus as claimed in claim 1, wherein said recording sheet conveying passageway has a length which is greater than the length of the recording sheet as measured in a direction in which the recording sheet is conveyed.

3. A thermal transfer printing apparatus as claimed in claim 1, wherein said recording sheet guide means is movable.

4. A thermal transfer printing apparatus as claimed in claim 1, wherein said platen roller serves concurrently as the recording sheet conveying means.

5. A thermal transfer printing apparatus as claimed in claim 1, wherein said recording sheet conveying means comprises an endless belt.

6. A thermal transfer printing apparatus as claimed in claim 5, wherein said recording sheet conveying means comprises at least one follower roller.

7. A thermal transfer printing apparatus as claimed in claim 5, wherein said recording sheet conveying passageway is constituted by said endless belt and said recording sheet guide means disposed adjacent said endless belt and spaced apart therefrom by a small gap for the recording sheet to move therethrough.

8. A thermal transfer printing apparatus as claimed in claim 1, wherein said recording sheet guide means comprises at least one pair of guide members positioned against each other with a small gap left therebetween for the recording sheet to move therethrough.

9. A thermal transfer printing apparatus as claimed in claim 8, wherein said recording sheet conveying passageway comprises said recording sheet guide means including a plurality of pairs of guide members, and follower rollers interposed between the plurality of pairs of guide members.

10. A thermal transfer printing apparatus as claimed in claim 3, wherein the recording sheet guide means is movable to a plurality of positions and the apparatus further has means for adjusting said recording sheet guide means to different ones of said positions to change the length of the recording sheet passageway.

11. A thermal transfer printing apparatus as clammed in claim 1, wherein the printing loop remains closed while the sheet is respeatedly conveyed always in the same direction past the heat generating member a number of times corresponding to the number of colors of ink on the ink sheet.

* * * * *